(12) United States Patent
Canteli Alvarez et al.

(10) Patent No.: US 12,246,945 B2
(45) Date of Patent: Mar. 11, 2025

(54) METHOD TO PREDICT A DETERIORATION IN A PASSENGER MOVING SYSTEM

(71) Applicant: TK Escalator Norte, S.A., Mieres (ES)

(72) Inventors: Francisco Canteli Alvarez, Gijon (ES); Ignacio Muslera Fernandez, Gijon (ES)

(73) Assignee: TK Escalator Norte, S.A., Mieres (ES)

( * ) Notice: Subject to any disclaimer, the term of this patent is extended or adjusted under 35 U.S.C. 154(b) by 356 days.

(21) Appl. No.: 17/758,387

(22) PCT Filed: Jan. 7, 2021

(86) PCT No.: PCT/EP2021/050191
§ 371 (c)(1),
(2) Date: Jul. 5, 2022

(87) PCT Pub. No.: WO2021/140154
PCT Pub. Date: Jul. 15, 2021

(65) Prior Publication Data
US 2023/0035017 A1    Feb. 2, 2023

(30) Foreign Application Priority Data

Jan. 7, 2020   (EP) .................................... 20382002

(51) Int. Cl.
*B66B 25/00* (2006.01)
*B66B 3/00* (2006.01)
(Continued)

(52) U.S. Cl.
CPC ............ *B66B 25/006* (2013.01); *B66B 27/00* (2013.01); *G05B 23/0221* (2013.01);
(Continued)

(58) Field of Classification Search
CPC ....... B66B 25/006; B66B 27/00; B66B 3/002; B66B 5/0025; B66B 23/24; G05B 23/0221
See application file for complete search history.

(56) References Cited

U.S. PATENT DOCUMENTS

| 5,092,446 A | 3/1992 | Sullivan, Jr. et al. |
| 5,785,165 A | 7/1998 | Stahlhut et al. |
| (Continued) | | |

FOREIGN PATENT DOCUMENTS

| CN | 105246810 A | 1/2016 |
| CN | 105502115 A | 4/2016 |
| (Continued) | | |

OTHER PUBLICATIONS

CN104817007 (Year: 2015).*
(Continued)

*Primary Examiner* — Gene O Crawford
*Assistant Examiner* — Lester Rushin, III
(74) *Attorney, Agent, or Firm* — Dinsmore & Shohl LLP (57) ABSTRACT

A method of predicting deterioration in a component part of a passenger moving system includes, activating at least one sensor in communication with the component part, performing data acquisition to acquire data from the at least one sensor, processing the data, repeating the processing step over a first specified time period, and triggering a command signal to initiate a maintenance operation and generating a predictive alert, both in response to the processed data reaching a pre-determined threshold.

17 Claims, 8 Drawing Sheets

(51) Int. Cl.
  *B66B 5/00*      (2006.01)
  *B66B 27/00*     (2006.01)
  *G05B 23/02*     (2006.01)
  *B66B 23/24*     (2006.01)

(52) U.S. Cl.
  CPC ............ *B66B 3/002* (2013.01); *B66B 5/0025* (2013.01); *B66B 23/24* (2013.01)

(56) References Cited

U.S. PATENT DOCUMENTS

| | | | | |
|---|---|---|---|---|
| 6,701,214 | B1* | 3/2004 | Wielebski | B65G 47/261 |
| | | | | 700/229 |
| 7,956,796 | B2* | 6/2011 | Hyodo | G01S 13/04 |
| | | | | 342/195 |
| 11,097,923 | B2* | 8/2021 | Eleid | B66B 1/3461 |
| 11,959,524 | B2* | 4/2024 | Park | F16D 66/027 |
| 2016/0052747 | A1 | 2/2016 | Touaoui | |
| 2016/0130114 | A1 | 5/2016 | Wilke et al. | |
| 2017/0247226 | A1 | 8/2017 | Roberts | |
| 2018/0029839 | A1 | 2/2018 | Chen et al. | |
| 2018/0029842 | A1 | 2/2018 | Li et al. | |
| 2018/0334363 | A1 | 11/2018 | Saarela et al. | |

FOREIGN PATENT DOCUMENTS

| | | |
|---|---|---|
| CN | 107304019 A | 10/2017 |
| CN | 107664705 A | 2/2018 |
| CN | 108609449 A | 10/2018 |
| EP | 3363758 A1 | 8/2018 |
| JP | 2009029540 A | 2/2009 |
| JP | 2009084009 A | 4/2009 |
| JP | 2009208932 A | 9/2009 |

OTHER PUBLICATIONS

CN106586796 (Year: 2018).*
Partial European Search Report, dated Jul. 24, 2020, in priority European Application No. EP 20382002.2.
Extended European Search Report, dated Oct. 13, 2020, in priority European Application No. EP 20382002.2.
International Search Report, dated Jul. 7, 2021, in International Application No. PCT/EP2021/050191.

* cited by examiner

METHOD TO PREDICT A DETERIORATION IN A PASSENGER MOVING SYSTEM

CROSS REFERENCE TO RELATED APPLICATIONS

This application is a U.S. National Stage Entry of International Patent Application Serial Number PCT/EP2021/050191, filed Jan. 7, 2021, which claims priority to European Patent Application No. EP 20382002.2, filed Jan. 7, 2020, the entire contents of each of which are incorporated herein by reference.

FIELD

The present disclosure generally relates to methods of predicting deterioration in a component part of a passenger moving system.

BACKGROUND

Passenger moving systems including escalators, moving walks and elevators, are stopped at various times for various reasons during their lifetime. Once a "stop" signal has been registered, the moving panels for example of an escalator or moving walk or the cabin of the elevator, experience first a reduction in speed before coming to a halt. During this stopping process, vibrations and friction between the moving components occur. At the beginning of a moving system's lifetime, a "stop" command can be affected within a short space of time and the corresponding stopping distance covers the shortest distance. This distance is normally measured in millimeters (mm). Over time however, due to everyday "wear and tear" on the moving system, this stopping distance gradually increases and continues to increase until it reaches a point where safety is compromised. Similarly, a handrail system experiences vibrations and friction that can cause every day wear and tear on the handrail.

All moving systems comprise a control unit that is configured to shut down a moving system in the event the operation of one or more component parts no longer complies with safety requirements, for example, the code or regulation EN115, B44.

Current methods of monitoring the health of passenger moving systems and ensuring they comply with safety regulations involves a technician manually reviewing all parts of the system during a routine maintenance check. This includes manually reviewing for example the brake shoes, or reviewing the wear on the handrail pulley of the escalator or moving walk.

Some passenger moving systems comprise display units that communicate to the technician the nature of the fault. Some systems comprise no such display unit, leaving the technician to perform a full check-up of the passenger moving system in order to deduce where the fault lies. Regardless of whether there is a display or not, this process is time consuming for the technician, expensive for the customer and causes significance inconvenience to passengers because the passenger moving system has to rendered "out of service".

EP 3363758 A1 discloses a mechanism for monitoring the operation of a passenger transport device. U.S. Pat. No. 5,785,165 discloses a data collection and analysis system for passenger conveyors. However, neither of these documents address the problem of deterioration in a component part of a passenger moving system, e.g., in a braking system, or a handrail system, or any other system comprised within a passenger moving system. Nor do they address the problem of being able to predict a deterioration before it occurs. Furthermore, no two passenger moving systems are the same, which means a prediction for a first system would not necessarily be the same for a second system.

Thus, a need exists to mitigate these problems in order to save
- time for the technician;
- money for the owner of the passenger moving system; and
- aggravation for the passengers.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a method of predicting a deterioration in a component part of a passenger moving system. The passenger moving system preferably comprises at least one or more sensor, and a control unit.

The component part according to the invention is any one or more part comprised within a passenger moving system. The component part can be movable or stationary and can comprise for example:

a movable part, for example a movable panel, wherein the movable panel preferably comprises a panel upon which a passenger stands when using the passenger moving system. Examples of a movable panel can include:
a pallet of a moving walkway;
a step of an escalator.
The component part can comprise one or more of:
a brake system;
a handrail system;
a safety system;
a rope system
a pulley system;
a balustrade
or any particular component part comprised therein.

Preferably the component part is in communication with the one or more sensor. The method according to the invention can be applied to any component part be it an individual part of a passenger moving system or comprised within a system of a passenger moving system. The method of the invention advantageously improves diagnostics within and availability of a passenger moving system.

The one or more sensor(s) is/are preferably in communication with the control unit via a wireless connection or a gateway device, for example an internet of things (IoT) device, e.g. a cloud, or via hardware.

The passenger moving system according to the invention preferably includes escalators, elevators, and moving walks.

In an embodiment of the invention, the deterioration relates to:
a deterioration in a brake system;
a deterioration in at least one handrail;
a deterioration in any component part in a passenger moving system;
a deterioration in any moving component part in a passenger moving system;
a deterioration in speed of any component part in a passenger moving system;

The method preferably comprises the method steps of;
a. activating the one or more sensor. Preferably, the sensor(s) is activated at all times. Preferably the sensor(s) is activated when the passenger moving system is in operation. Preferably the sensor(s) is activated each time the component part, for example, a movable panel passes the sensor(s)
during transit; or
several times per revolution of the motor controlling the movement of the passenger moving system; or
several times per revolution of the main shaft of the passenger moving system.

Preferably the one or more sensor is adapted to respond to a change in the operation, e.g. motion of the passenger moving system. Preferably the sensor(s) measures any one or more of the group comprising:
speed, preferably the sensor(s) constantly measures speed
distance, preferably the sensor(s) constantly measures distance;
temperature, preferably the sensor(s) constantly measures temperature;
any measurable feature relating to the health of a component part comprised within a passenger moving system.

Preferred sensors include magnetic sensors, inductive sensors, optical sensors, capacitance sensors, encoder sensors, e.g., rotary encoders.

b. performing data acquisition. Data is collected over a pre-defined time interval. Preferably data acquisition includes:
calculating a deviation in speed of one or more component part of the passenger moving system;
calculating a stopping distance, e.g. in millimeters (mm) of one or more component part of the passenger moving system;
calculating a deviation or any operational health characteristic of one or more component part of the passenger moving system, e.g., thickness of a pulley and/or a pulley jacket.

Data acquisition can be carried out for example by the control unit using the inputted information for the e.g., motor and/or main shaft and/or pallet band sensors in association with any current status information obtained from the passenger moving system.

Stopping distances and the code of regulation pertaining thereto can vary between different passenger moving systems. Speed variations and other operational health characteristics of a particular component part, e.g., a handrail system and the code of regulation pertaining thereto can also vary between different passenger moving systems.

Preferably, the method step b. is performed permanently, wherein the command signal initiating the maintenance operation is triggered and the predictive alert is generated when the processed data reaches the pre-determined threshold.

Alternatively preferably, the method step b. is repeated over a specified time period, wherein the command signal initiating the maintenance operation is triggered and the predictive alert is generated when the processed data reaches the pre-determined threshold.

c. refining the acquired or collected data, preferably by applying one or more of a pre-determined filter;
d. processing the data by running it through an algorithm or series of algorithms to determine a trend, wherein the trend enables at least one or more of the following to be carried out:
determining a deterioration or deviation in at least one health characteristic of the passenger moving system, including:
handrail speed;
stopping distance;
health of a component part;
performing a cross-check of the absolute value with a pre-determined threshold value in order to show a consistent increase or decrease in the at least one health characteristic of the passenger moving system;
determining whether an increase or decrease in the measured health characteristic of the passenger moving system has reached or exceeded the pre-determined threshold value;
detecting any constant excessive trend or a value higher than the pre-determined threshold value;
detecting whether a variation between one particular value when compared with another particular value recorded in similar conditions but in a previous time interval has reached or exceeded the pre-determined threshold value;
any combination of the above.

e. Preferably the method steps c. to d. are repeated over a specified time period. The specified time period preferably refers to a number of hours, a number of days, a number of weeks or a number of months. Preferably the period of time covers at least a month having up to 31 days so that a comparison of data "from month-to-month" is possible.

A command signal initiating a maintenance operation is triggered and a predictive alert is generated when the processed data, reaches or exceeds the pre-determined threshold value. The pre-determined threshold value is selected according to the type of passenger moving system, its nominal speed and the relevant code of regulation. The relevant code of regulations for escalators for example would be EN115/B44. This details not only stopping distances but also speed deviation and other operational health characteristics. For example, when a stopping distance reaches and/or exceeds a pre-determined threshold, the control unit is adapted to block the passenger moving system, i.e., it will cause it to shut down until the necessary maintenance work is carried out. The invention therefore advantageously provides a method that can be tailored to the safety requirements of the specific passenger moving system wherein the method allows for a monitoring of the health of any movable component part and predicts when a fault in passenger moving system is near, e.g., a fault in the brake system, a fault in the handrail system, thereby avoiding untimely shut-downs and improving safety and comfort for passengers.

A maintenance operation preferably includes
informing the relevant party, e.g., the customer; a building services manager; a technician that the brake of e.g. the escalator needs to be inspected and/or
the subsequent repair or replacement thereof. This can for example take the form of displaying an error code on a display unit comprised within the passenger moving system. This advantageously avoids the risk of exceeding the excessive stopping distance and thus avoids an automatic shut-down of the passenger moving system.

This method can be carried out over a specified time period, preferably constantly over a specified time period. The method can be adapted to acquire data at pre-defined time intervals over this time period. For example, the method can be performed:
over a number of months, wherein the data is acquired during e.g., every second or third day; or
over a number of months, wherein data is acquired e.g. during every 5 hours; or
over a number of months, wherein data is acquired e.g. during every 1 to 5 minutes. The specified time period and the pre-defined time intervals over said time period can vary between minutes, hours, days and months. This optimizes maintenance efficiency and increases the operational lifespan of the moving system.

Preferably, the specified time period is one selected from the group comprising:
any number of months between 1 to 50 months,
any number of months between 2 to 36 months,
any number of months between 2 to 24 months
any number of months between 2 to 12 months.

Preferably the pre-defined time intervals for acquiring data within the specified time period can be any one selected from the group comprising:
every minute; every second minute; every n minute;
every hour; every second hour; every n hour;
every day; every second day; every n day.

This advantageously allows for flexibility within the method.

Preferably, a filter operation is applied after method step (d) to determine any trend in the processed data, e.g., a trend in stopping distance, a trend in speed variation or a trend in an operational characteristic. This advantageously ensures that only useful data is taken into consideration and any "abnormal" data is prevented from skewing results and negatively affecting the excessive stopping distance.

It is also possible, that the pre-determined threshold is determined by selecting a specific measured value of the data, preferably of the processed data from step c., and selecting a defined proportion, preferably 10 percent, of the specific measured value in order to form the pre-determined threshold (dF) in conjunction with the specific measured value as upper and/or lower limit.

Further, it is possible, that measured values of the acquired data from step b are permanently checked with respect to one or more outliers that fall below the lower limit and/or exceed the upper limit of the pre-determined threshold, parallel to the repetition of step c,
wherein the outlier(s) is (are) preferably filtered out immediately as a filtering step, so that the repetition of step c is performed without outlier influences. The filtering step can correspond to the aforementioned filter operation, for example. Parallel to the repetition of step c means that the permanent checking of the data is executed independent of step c.

This will be explained by means of an example, leaving the units out of consideration here, in order to be able to illustrate the principle more simply. Assuming that during step c. the following data of the following measurement series are processed: "0.65, 0.7, 0.55, 0.6, 0.82 and 0.7", then the value 0.65, for example, would form the specific measured value. The specific measured value can remain static, be used for several processes or be renewed per process. A defined proportion of 0.65 can be assumed, for example 0.065, which corresponds to ten percent of 0.65. This 0.065 can be added to the specific measured value 0.65 to form an upper limit (0.715) and/or subtracted from 0.65 to form a lower limit (0.585). This upper limit and/or lower limit can each be assumed to be a pre-determined threshold. Based on the upper measurement series, 0.82 would then be immediately sorted out as an outlier because 0.82 is greater than 0.715. Thus, for the next time of step c., this value would not distort the trend. It can be seen that this procedure allows data to be cleaned of outliers in a particularly efficient manner, so that the truest possible trend can be determined.

For example, the last processed value can be used as the specific measured value. If several steps c. have already been performed, it can be assumed that the specific measured value is then free of outliers and thus relatively accurate. However, it is also possible to select the specific measured value differently.

It is also possible that the pre-determined threshold is not determined as a percentage, but for example as a fixed value.

Preferably, this has the effect of keeping outliers out of the data, which is subsequently processed. Provided that step b. is performed periodically, filtering is preferably done immediately before step c., which in particular determines the trend of the data. If step b. is performed periodically, this can save computing capacity and energy, so that efficiency increases. If step b is performed permanently, the outliers are preferably filtered out immediately and do not load the buffer.

Preferably, the pre-determined threshold is set according to the code of regulation pertaining to the specific type of passenger moving system. This advantageously provides for a "tailor-made" method that can be applied to any type of passenger moving system. Table 1 and table 2 provide details from the code of regulation EN115 relating to excessive stopping distances for escalators and moving walks respectively.

TABLE 1 stopping distances for escalators

| Nominal speed v | Stopping distance between |
|---|---|
| 0.5 m/s | 0.20 m and 1.00 m |
| 0.65 m/s | 0.30 m and 1.30 m |
| 0.75 m/s | 0.4. m and 1.50 m |

TABLE 2 stopping distances for moving walks

| Nominal speed v | Stopping distance between |
|---|---|
| 0.5 m/s | 0.20 m and 1.00 m |
| 0.65 m/s | 0.30 m and 1.30 m |
| 0.75 m/s | 0.4. m and 1.50 m |
| 0.90 m | 0.5 m and 1.70 m |

In relation to a deterioration of a handrail system, for example, a speed deviation of the handrail, or deterioration within the pulley system EN115/B44 requires that for a speed deviation greater than 15% during more than 15 seconds, the escalator must stop. However, it is possible that even with this requirement; the escalator can continue to operate for a period of time thereby jeopardizing passenger safety. By implementing the method according to the invention, this safety risk can be mitigated.

A speed deviation in a handrail system preferably refers to a change in the linear speed of the handrail. An abnormal handrail speed value can be caused for example by:
pulley wear;
a lack of tension in the handrail traction system;
a reduction in the diameter of the handrail drive wheel/pulley;
changes in environment temperature;
changes in handrail temperature;
a lack of tension within the component parts of the handrail system, e.g., a compression spring. This can occur for example when there is no contact between a handrail drive wheel or pulley and the handrail. In such a situation, the speed of the handrail can change temporarily to zero.

This is by no means intended as an exhaustive list of factors that can cause a change in the linear speed of the handrail. Excessive wear and tear can result in for example inadequate friction within the handrail system, e.g., between the handrail and the drive wheel. This can cause the handrail to slide and fall out of rhythm with the moving pallets, thereby posing a safety risk.

Analyzing a trend in the speed deviation of the handrail by monitoring any one or more of the examples stated above, according to the method of the invention, will allow for a prediction on handrail health to be made. Consequently, this increases in the availability of the passenger moving system since it avoids any unnecessary shutdowns, thereby reducing the maintenance and reparation time as well as ensuring code compliance.

The invention also relates to a use of the method as outlined above to measure deterioration in a component part of a passenger moving system. The component part can be movable or stationary. The component part preferably comprises at least one sensor.

Preferably the method according to the invention can be used in a passenger moving system selected from the group comprising:
an elevator;
an escalator;
a moving walk.

Figure 1:
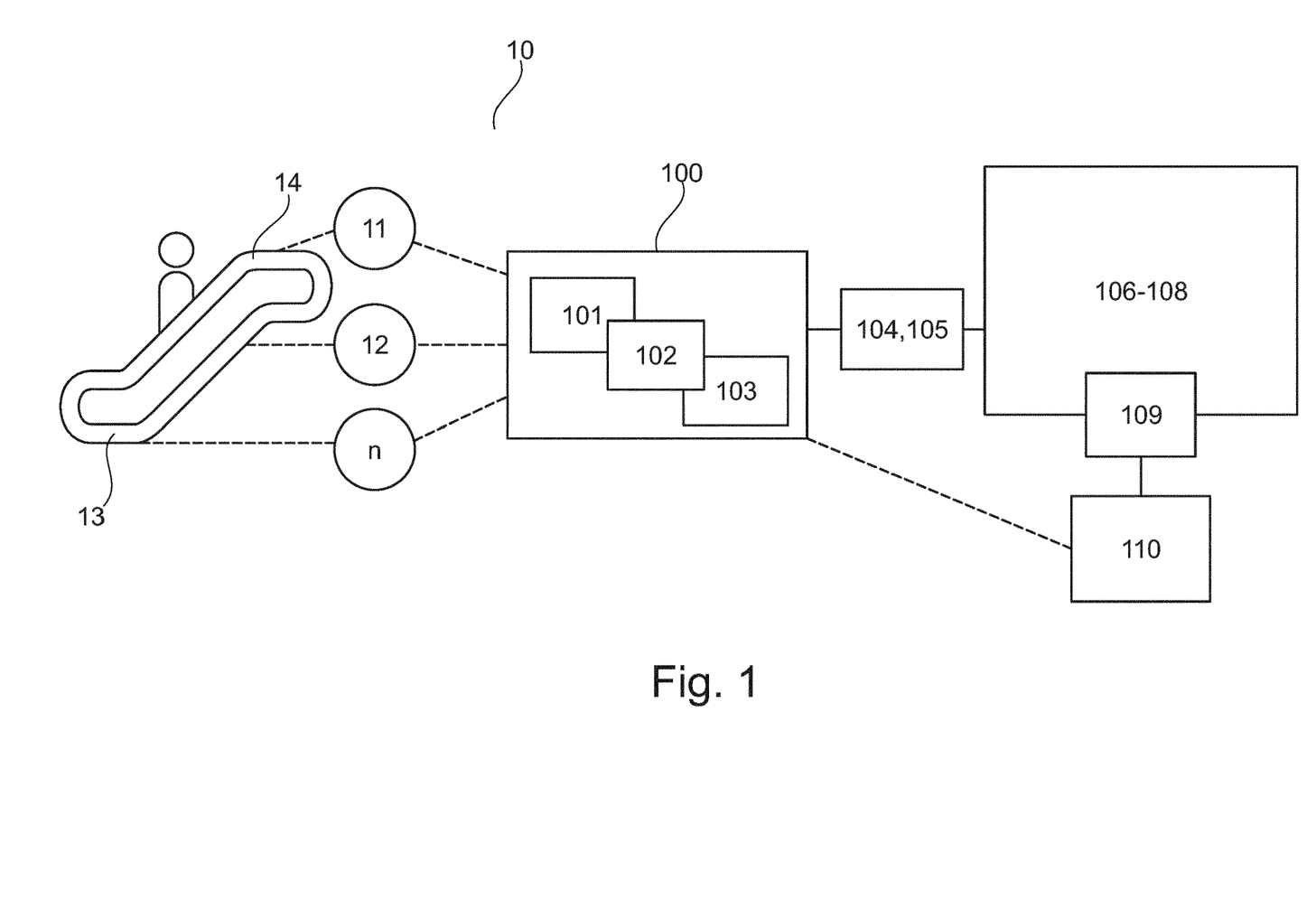
FIG. 1 is a schematic diagram of a passenger moving system practicing an embodiment of a method of the present disclosure.

FIG. 1 shows a schematic diagram of a passenger moving system 10 implementing a method 1 according to an embodiment of the invention. In this particular example, the moving walkway 10 is an escalator wherein the escalator comprises a control unit 100 and at least one movable panel 101. The deterioration relates to the brake system. The control unit 100 is in communication with a gateway device (not shown), for example, a computer or portable laptop wherein e.g., the computer is equipped with the required software to communicate with the control unit 100 allowing for the condition of the escalator 10 to be constantly monitored. A pre-determined threshold is inputted at the control unit. This threshold is determined by the regulation EN115/B44.

The method can be carried out with one or more sensor, however for illustration purposes, three sensors are shown in this example. A first sensor 11 measures the movement of at least one movable panel 13 about the exit of the escalator 10. A second sensor 12 measures the movement of at least one movable panel 13 about the middle of the escalator 10 and a third sensor n measures the movement of at least one movable panel 13 about the entrance of the escalator 10. The sensors 11, 12, n in this particular example are magnetic sensors. It is also possible that the sensors are in the motor (not shown) or in the main shaft (not shown) so that said sensor(s) can sense any starting and stopping. The sensors 11, 12, n are activated each time the relevant moving panel 13 passes by the respective sensor 11, 12, n during a looped transit.

When the moving panels 13 begin to stop, data acquisition begins. The escalator is stopped for example via, a safety switch, a mechanical switch, a button, or any other stopping mechanism known in the art. Activation of any one of these stopping mechanisms will activate the at least one sensor and allow data acquisition to begin.

The stopping distance is continuously measured until the panels 13 come to a complete stop. An analysis of the stopping operation, in particular the excessive stopping distance is performed at the control unit 100 thereby providing a forecast on the condition of the brake system (not shown). This analysis involves the method outlined in steps 101 to 110.

Steps 101 to 103 are performed at the control unit 100 of the passenger moving system. Step 101 requires activating the sensors 11, 12, n and stopping the panels 13 in order that data acquisition can begin in step 102. The data in this particular example relates to the stopping distance measured for each time the moving walkway 10 is stopped Step 102 involves measuring and calculating the corresponding stopping distance. This information is transmitted to an interface module in step 103. In this particular example, the interface module is an internet of things (IoT) device, e.g., a cloud. The calculated distance(s) is/are pre-processed in step 104, this involves an initial filtering and refining of data. The pre-processed data is sent to a database in step 105 to perform data processing and analysis. The database can be comprised of hardware e.g., a USB, or be located in a cloud.

Processing is carried out in step 106 allowing the data to be filtered in step 107. Filtering involves removing outliers in order to take into account the behavior, normal or otherwise of the escalator 10. This includes for example, removing any data which was recorded when the unit was travelling at a speed different to the nominal speed, or when the data was recorded when the escalator 10 was stopped "abnormally", e.g., it started in the wrong travelling direction and was immediately stopped before having reached its nominal speed; or human interference, e.g. the emergency stop was triggered; or technical maintenance was carried out; or the escalator 10 is running at full capacity, i.e., there is no space for any more passengers to travel on it.

In such exceptional situations, the stopping distance will be abnormal and thus not a true reflection of a braking operation under normal conditions. If the escalator is stopped for travelling in the wrong direction, the stopping distance will be small due to the slow speed achieved by the escalator in that short space of time. If the escalator is moving at a higher speed and the emergency brake is triggered, the stopping distance will be larger. Should any of these situations arise, the escalator will stop in the normal way however the corresponding data readings are described as "abnormal" and are thus preferably discounted during processing. A variation of several mm or less, e.g., (2 to 20 mm) in the stopping distance over a time period of e.g. one week is considered as "normal". During the monitoring of the stopping distance over a specified time period, e.g., 31 days, a constant increase in stopping distance is expected due to increased wear on the brake. The filtered data is analyzed in step 108.

Analysis 108 can include
taking into account the resolution of the signal that generates points with minimum variation. This depends on the amount of data saved in the database. A reduction in resolution makes it easier to filter the results;
selecting the maximum or minimum values for the data associated with a specific period of time. The nature of the selected values can vary between the maximum and minimum if desired;
analyzing the selected values to find a trend in order to detect a consistency in the stopping distance;
additionally, or alternatively to the preceding point, cross-checking an absolute value obtained with the pre-determined threshold value.

Once analysis is complete, a result is obtained in step 109, wherein the result is a detected trend showing deterioration. A command signal initiating a maintenance operation will be triggered and a predictive alert generated in step 110 to inform the relevant party, e.g., the customer; a building services manager; a technician, that the brake system of the passenger moving system needs to be inspected and where necessary, repaired, replaced or adjusted when:

the trend shows a consistent increase in the stopping distance;
a cross-checking of the absolute value with the threshold value shows a consistent increase in the stopping distance;
the stopping distance has reached or exceeded the pre-determined threshold;
an excessive positive trend or a value higher than the threshold is permanently detected;

the variation from one value to a value in similar conditions but in a previous time interval has reached or exceeded the pre-determined threshold,
any combination of the above.

Figure 2:
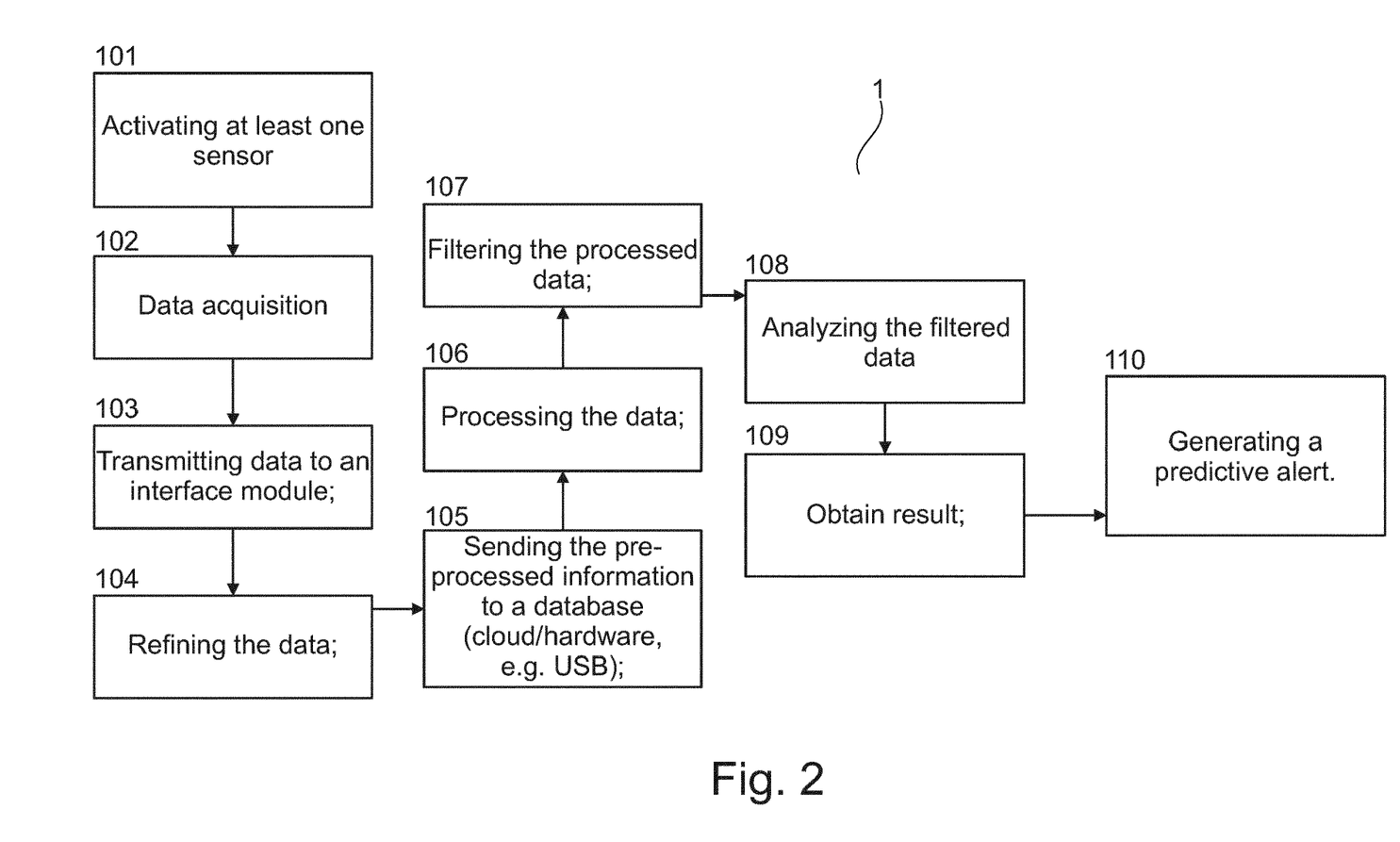
FIG. 2 is flow chart of an embodiment of a method of the present disclosure.

FIG. 2 shows a flow diagram of the method steps as outlined in FIG. 1.

Figure 3:
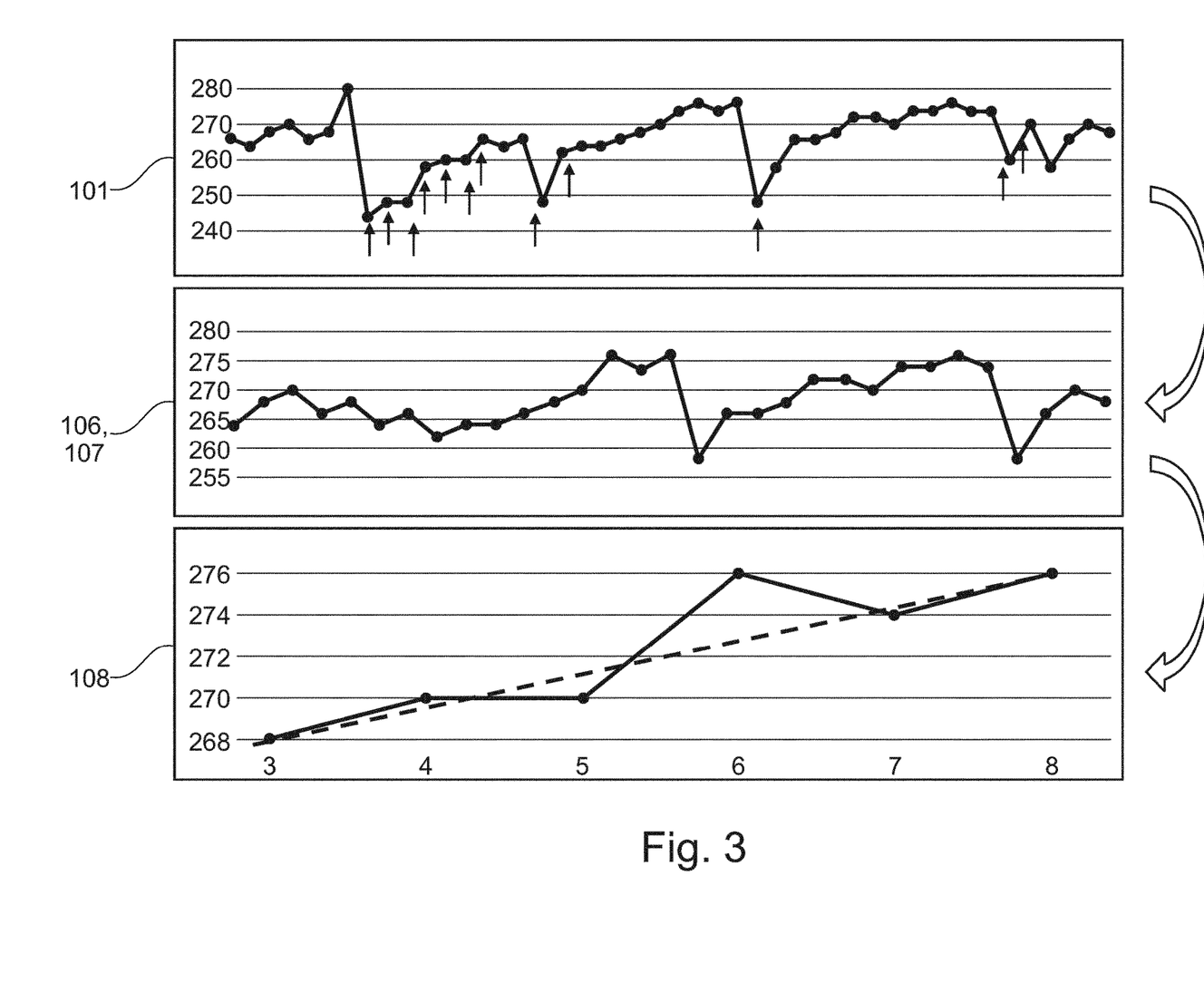
FIG. 3 is a set of schematic graphs representing an example of treatment of example data during various method steps of an embodiment of a method of the present disclosure.

FIG. 3 shows the difference in the recorded data before and after analysis between steps 101 and 108. The top graph corresponds to step 101 wherein data points are recorded for each day. The x-axis represents the time each time the escalator stops. There can be several points recorded per day. The y-axis details the stopping distance in millimeters, which runs from 240 mm to 280 mm.

The middle graph shows the recorded data after having been filtered in step 107. The data points in the first graph which have an arrow depict "abnormal" readings and are discounted in the filtering step thus reducing the number of total data points. The middle graph has an x-axis detailing the dates, and a y-axis detailing the stopping distance in millimeters, which runs from 255 mm to 280 mm.

The bottom graph shows the recorded data after a final analysis is carried out in step 108 and provides a result (step 109). An average data point is recorded to represent the reading over a particular week. The x-axis details the "number of weeks", in this particular example, the time period is 6 weeks running from week 3 to week 8. The y-axis details the stopping distance in millimeters, which now runs from 268 mm to 276 mm. If, in this particular example the pre-determined threshold for the stopping distance was 280 mm, no predictive alert would be triggered since the maximum stopping distance recorded was 276 mm. Thus the escalator 10 would be allowed to continue to operate as normal. If however, the pre-determined threshold value was 275 mm or 276 mm, the highest recorded value of 276 mm reaches or surpasses this threshold, thus a command signal initiating a maintenance operation is triggered and a predictive alert signal is generated i.e., inform the relevant party, e.g., the customer; a building services manager; a technician, that the brake of the escalator 10 needs to be inspected and where necessary, repaired, replaced or adjusted. When the data is processed in the cloud, a command signal initiating a maintenance operation can be triggered and a predictive alert signal can be generated at anytime within the method as shown in FIG. 2 when the processed data reaches a pre-determined threshold.

Figure 4:
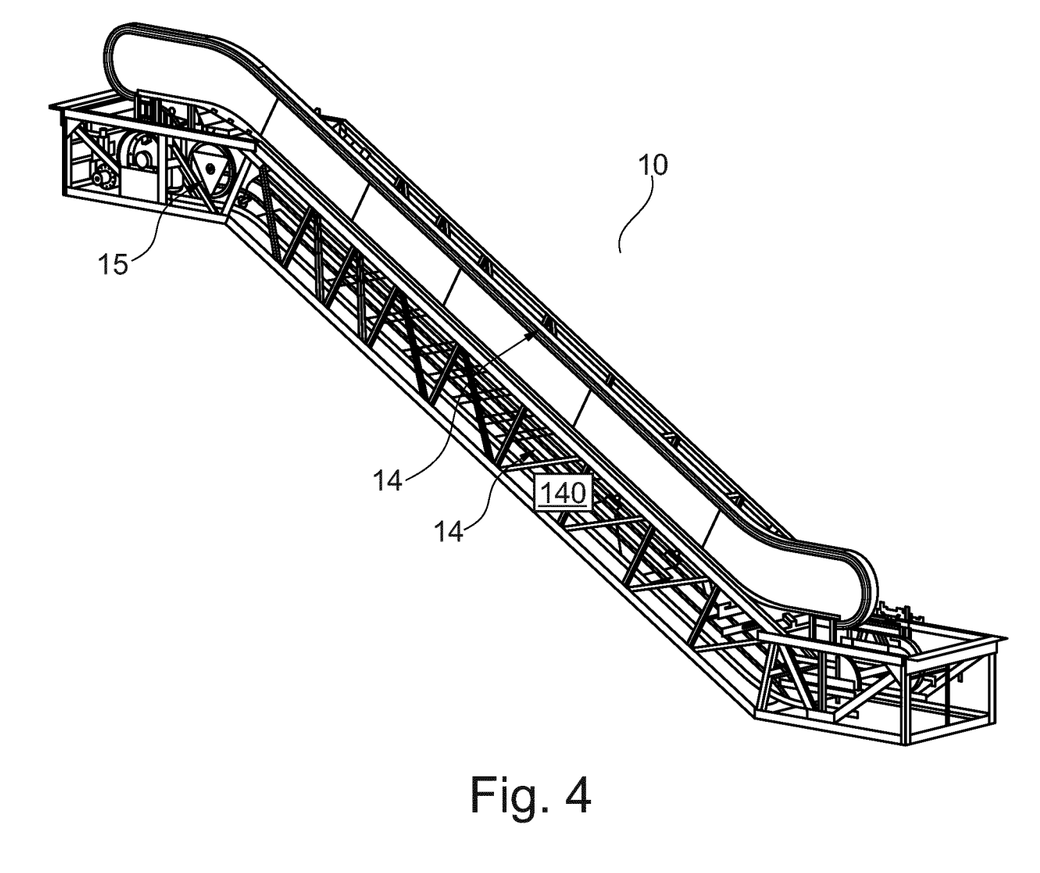
FIG. 4 is an isometric view of an embodiment of a handrail system in a moving walkway of the present disclosure.

FIG. 4 shows a representation of a passenger moving system 10 and some of its component parts. In this particular example, the passenger moving system 10 is an escalator. The escalator 10 comprises a handrail system 140 comprising a handrail 14—only one handrail 14 on one side of the escalator 10 is shown. The handrail 14 is driven by a pulley or drive wheel mechanism 15 located in the upper escalator part.

Figure 5:
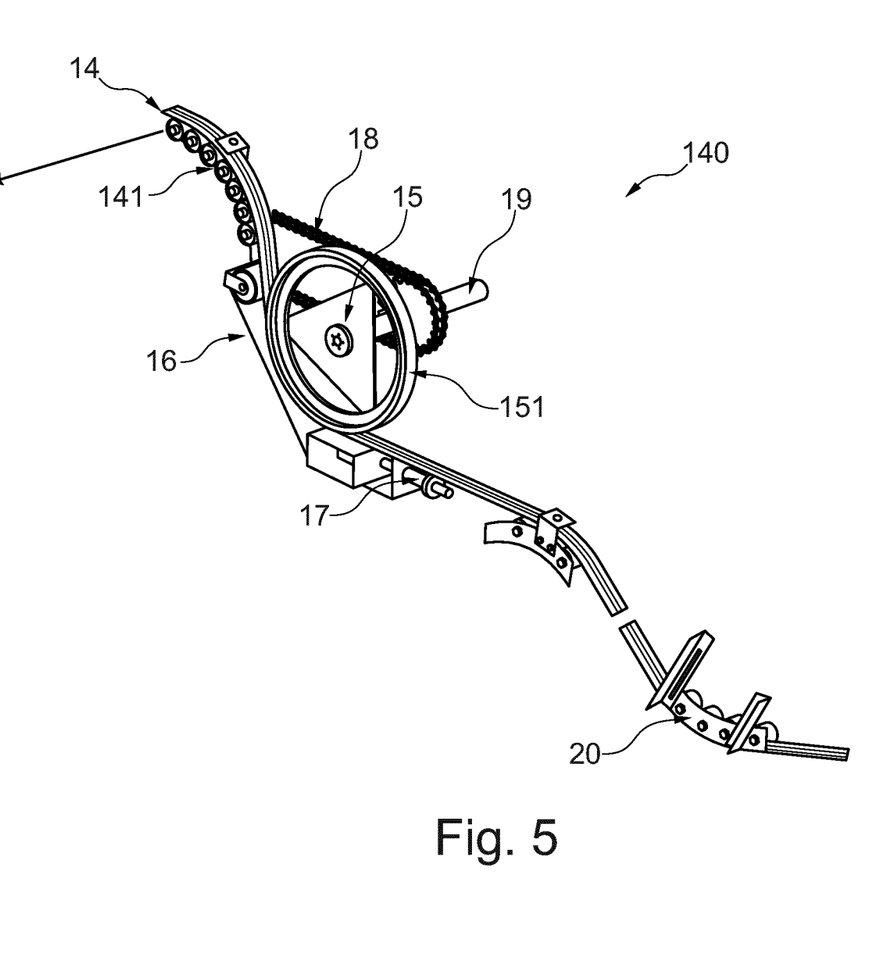
FIG. 5 is an isometric view of an embodiment of a collection of component parts from an embodiment of a handrail system in a moving walkway of the present disclosure.
Figure 5A:
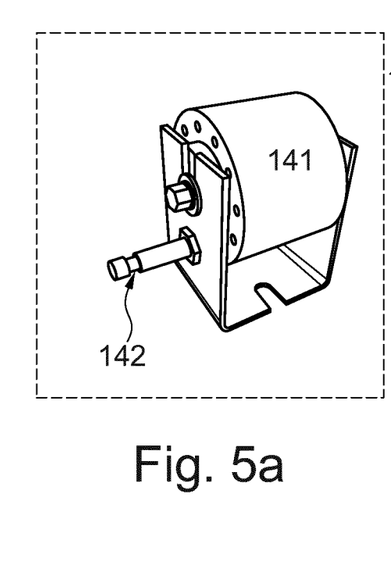
FIG. 5a is an isometric detail view of an embodiment of a rolling element from the collection of component parts in the handrail system of FIG. 5.
Figure 6:
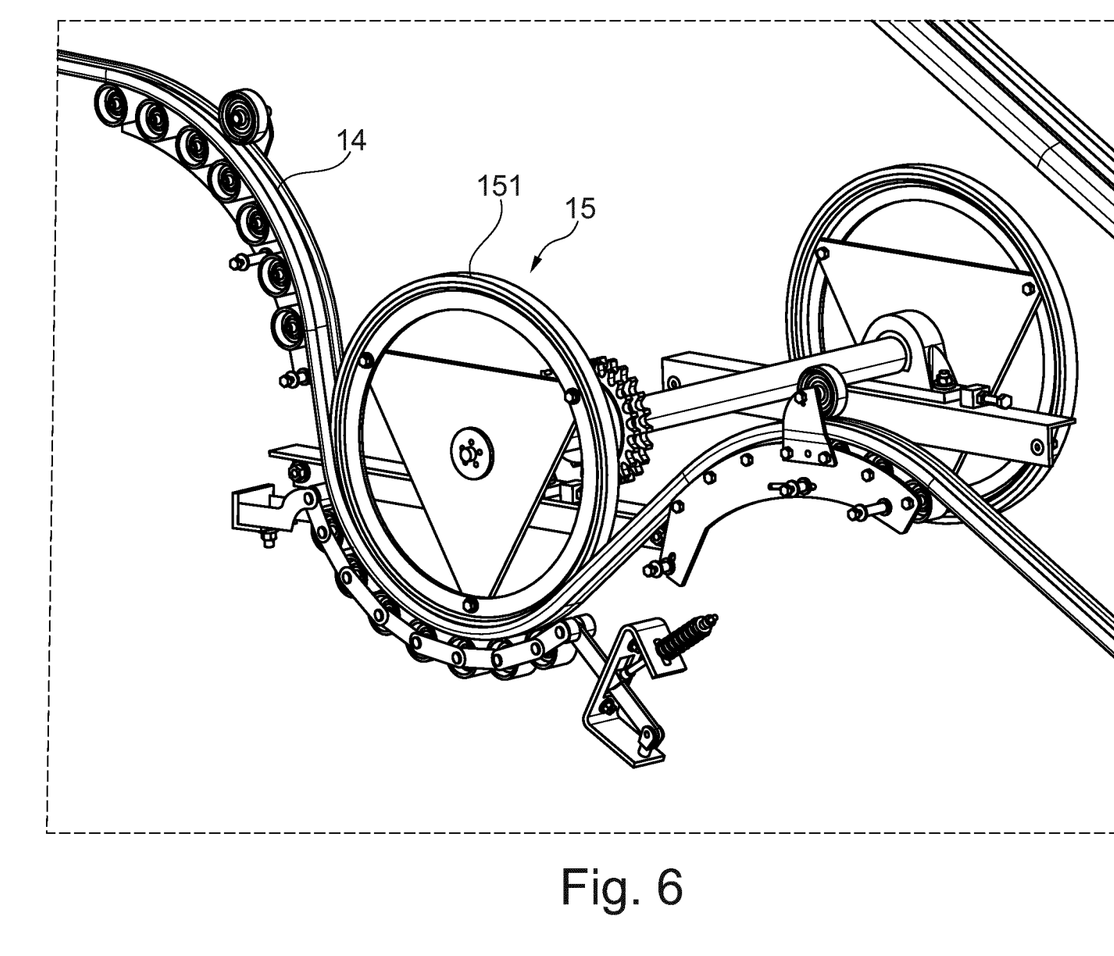
FIG. 6 is an isometric detail view of an embodiment of a pulley, pulley jacket, and sensor from the collection of component parts in a handrail system in a moving walkway of the present disclosure.

FIG. 5 shows a representation of component parts comprised within the handrail system 140 in more detail. The handrail 14 travels along a pulley 15 which is connected to a handrail drive shaft 19, driven by a drive chain 18. The pulley 15 comprises a pulley jacket 151 wherein the jacket 151 serves to ensure a high friction between the inner part of the handrail 14—i.e., the surface of the handrail 14 that directly contacts the pulley 15 surface—and the pulley 15. The pulley jacket 151 in this particular example comprises a rubber bandage. The handrail 14 travels between the pulley 15 and a pressure belt 16, or other suitable means, during transit. The handrail 14 travels over a plurality of rolling elements 141 which are shown more clearly in FIG. 5*a*. The complementary movement of both the pulley 15, including the pulley jacket 151 and the pressure belt 16 facilitates the travel of the handrail 14 in its looped transit by providing a pressure which helps to avoid damage on the surface of the handrail 14. FIG. 6 also shows in further detail the pulley jacket 151 about the pulley 15. Overtime however, the pulley jacket 151 can suffer from wear and tear due to the applied pressure and consequent degradation of the jacket material itself. This can cause a reduction in the overall pulley 15 diameter—which can also be used as an indicator of a deterioration in handrail speed.

Figure 7:
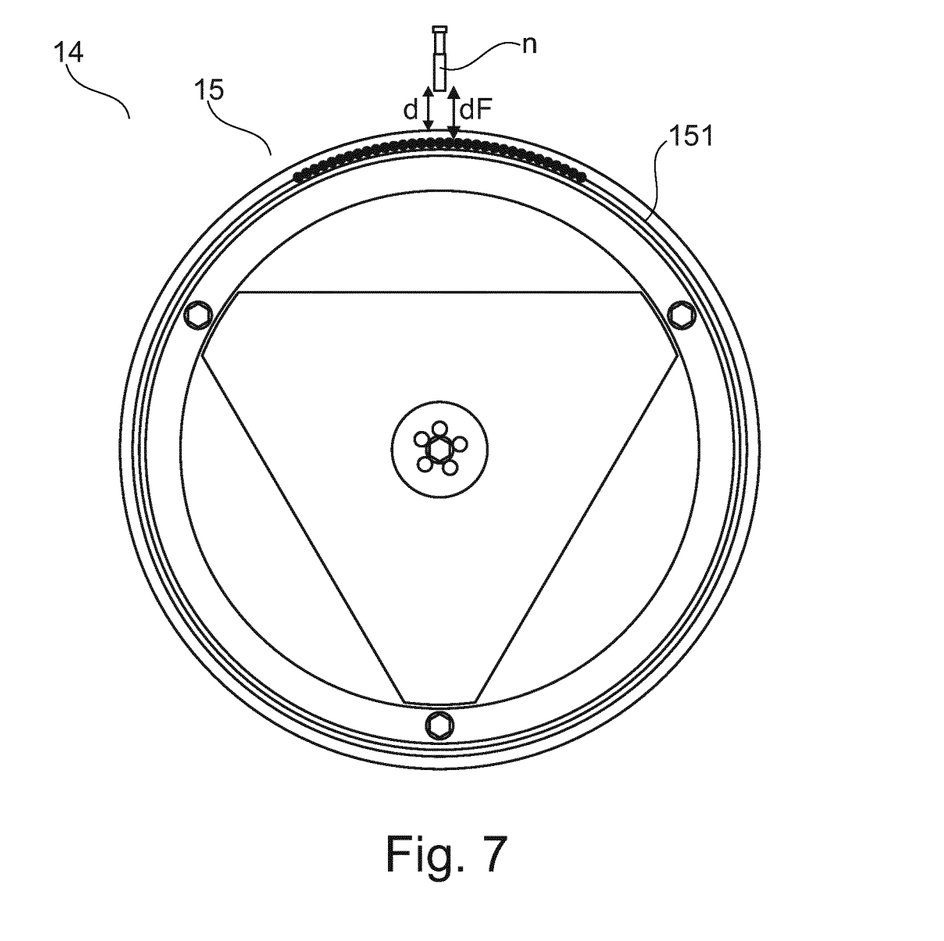
FIG. 7 is a front view of an embodiment of a pulley, pulley jacket, and sensor in a handrail system in a moving walkway of the present disclosure.

FIG. 7 shows a close-up view of the pulley 15 having a pulley jacket 151, with a sensor n placed a distance d from the outermost surface of the pulley 15, said surface can be the pulley 15 itself, or the pulley jacket 151. In this particular example, a distance dF has been set as the threshold value, and inputted into the control unit (not shown) for monitoring purposes. The threshold value is determined by the safety regulations relating to such a handrail system 140 and its component parts, e.g., EN115/B44.

Monitoring the pulley jacket 151 in this particular example is carried out by measuring the thickness of the jacket 151 using the sensor n. The distance between the outermost surface of the jacket 151 and a fixed point, e.g., a fixed position within the escalator truss is measured. When the jacket 151 wears down and reaches or exceeds the threshold value dF, a command signal initiating a maintenance operation is triggered and a predictive alert is generated. By monitoring the health of the jacket 151, it is possible to determine its current health status and predict future performance, in particular to predict a possible deterioration.

The method follows the method steps as outlined in FIG. 2. In step 101, the activated sensor n is registered at the control unit 100. The control unit 100 is preferably in communication with a gateway device, for example, a computer or portable laptop wherein e.g., the computer is equipped with the required software to communicate with the control unit 100 allowing for the condition of the pulley 15 and in particular the pulley jacket 151 to be monitored.

Data acquisition (step 102) occurs during the operation of the handrail, preferably over a specified time period. The values measured for the sensor n is recorded at the control unit. This is preferably done in real time. This information is transmitted to an interface module e.g. an internet of things (IoT) device, e.g., a cloud in step 103. The measured and recorded values are pre-processed wherein an initial filtering and refining of data takes place in step 105. The pre-processed data is sent to a database to perform data processing and analysis in step 106. The database can be comprised of hardware e.g., a USB, or be located in a cloud. The database preferably comprises pre-stored information that is used to provide a comparison between the measured data. This facilitates detecting any deterioration in the handrail.

The data is then processed and further filtered in step 107. Filtering involves removing outliers in order to take into account the behavior, normal or otherwise of the passenger moving system. This includes for example, removing any data which was recorded when for example:

there was an increase in vibration within the passenger moving system;

there was a significant increase in load due to a high number of passengers travelling on the passenger moving system.

In such exceptional situations, measured values will be abnormal and thus not a true reflection of the operation of the passenger moving system under normal conditions. Once filtered, the data is analyzed in step 108.

Analysis can include for example:

taking into account the resolution of the signal that generates points with minimum variation. This depends on the amount of data saved in the database. A reduction in resolution makes it easier to filter the results;

selecting the maximum or minimum values for the data associated with a specific period of time. The nature of the selected values can vary between the maximum and minimum if desired;

analyzing the selected values to detect the presence of a trend, e.g., whether there is a consistent decrease in the handrail speed;

additionally, or alternatively to the preceding point, cross-checking an absolute value obtained with the pre-determined threshold value dF and/or with the data collected from another handrail, preferably the complementary handrail.

Figure 8:
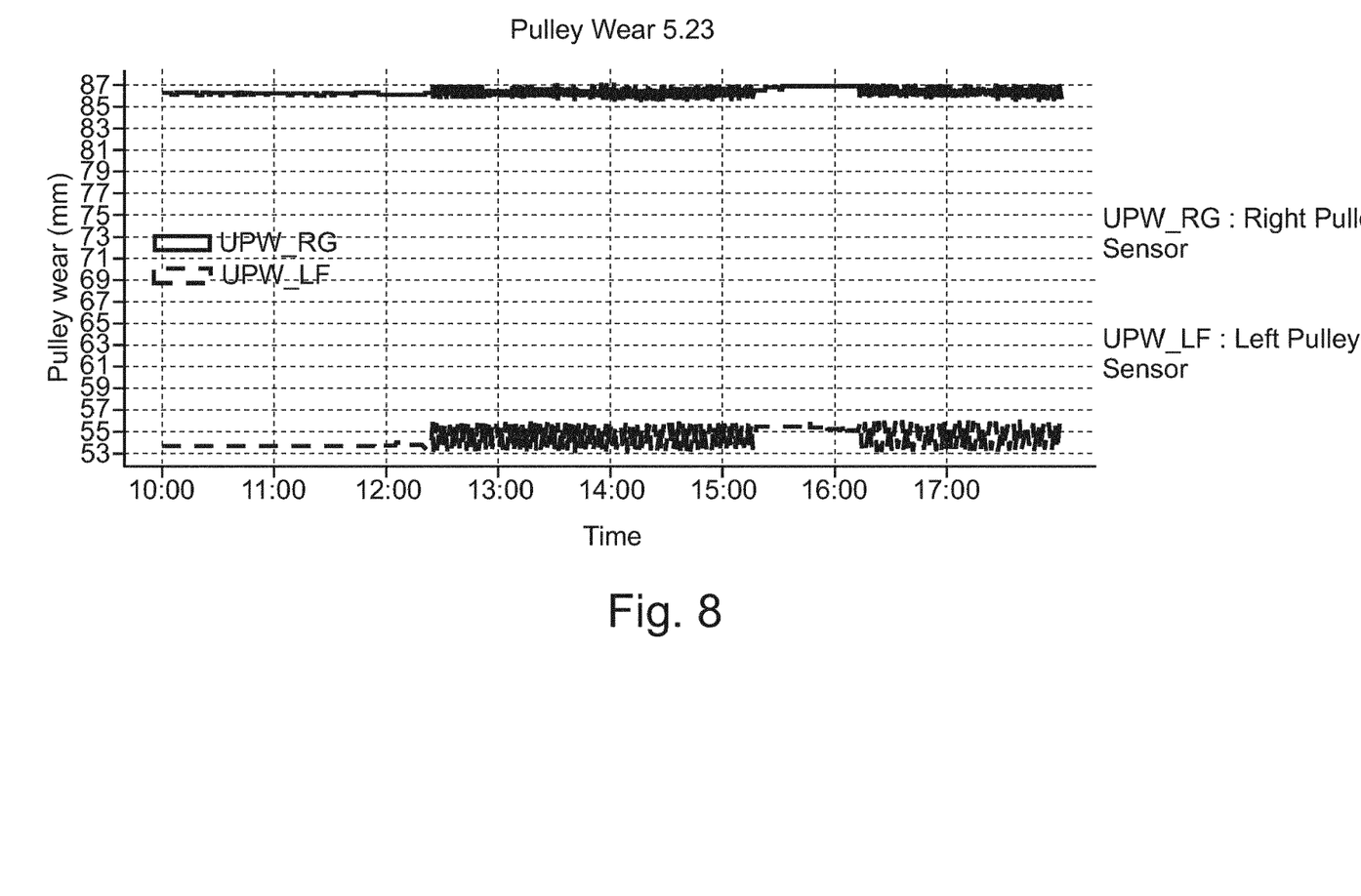
FIG. 8 is a schematic graph representing an example of data obtained during the practicing of an embodiment of the method of the present disclosure.

FIG. 8 shows a typical reading once analysis is complete and a result is obtained (step 109). In this example, it shows the health profile for the handrail system 140 as a whole, i.e., the handrail 14 on each side of the moving pallets. Since each handrail 14 comprises the same component parts, two same sensors, located at the same relative position within the handrail system 140 were used—a first sensor in a first handrail, e.g., the left handrail, and a second sensor in a second handrail, e.g., the right handrail. The readings at the bottom of the graph represent the left pulley sensor n in the left handrail 14 whilst the readings at the top of the graph represent the right pulley sensor in the right handrail.

These readings provide a health profile of the pulley, in particular a thickness profile of the pulley jacket 151 for each handrail 14. The readings for the left pulley sensor n representing the left pulley 15 show a higher degree of pulley wear on the pulley jacket 151 than the readings for the right pulley 15.

Since the health profile allows for the detection of a trend showing deterioration at the left pulley 15, a command signal initiating a maintenance operation is triggered and a predictive alert is generated in step 110 to inform the relevant party, e.g., the customer; a building services manager; a technician, that the handrail 14 of the handrail system 140 of the passenger moving system 10 needs to be inspected and where necessary, repaired, replaced or adjusted.

The command signal is triggered when:

the trend shows a consistent variation in the health of the pulley 15, in particular the pulley jacket 151;

a cross-checking of the absolute value with the threshold value shows a consistent variation in the health of the pulley jacket 151;

the variation in the health of the pulley 15, in particular the pulley jacket 151 has reached or exceeded the pre-determined threshold;

an excessive trend or a value higher than the threshold is permanently detected;

the variation between one particular value when compared with another particular value recorded in similar conditions but in a previous time interval has reached or exceeded the pre-determined threshold, any combination of the above.

Instead of monitoring the health of the pulley jacket 151 using the sensor n as shown in FIG. 7, a different sensor 142 located at the rolling element 141 can be used in the inventive method to measure the speed of the handrail 14. It is also possible to use a sensor which monitors the tension within the compression spring to monitor the speed of the handrail 14, however, for the purpose of this particular example, the sensor 142 at the rolling element 141 is used. A pre-determined threshold value is inputted at the control unit. The pre-determined threshold value is selected according to the type of passenger moving system, its nominal speed and the relevant code of regulation e.g., EN115/B44.

The method follows the method steps as outlined in FIG. 2. In step 101, the activated sensor 142 is registered at the control unit 100. The control unit 100 is preferably in communication with a gateway device, for example, a computer or portable laptop wherein e.g., the computer is equipped with the required software to communicate with the control unit 100 allowing for the condition of the pulley 15 and in particular the pulley jacket 151 to be monitored.

Data acquisition (step 102) occurs during the operation of the handrail, preferably over a specified time period. The values measured for the sensor 142 is recorded at the control unit. This is preferably done in real time. This information is transmitted to an interface module e.g. an internet of things (101) device, e.g., a cloud in step 103. The measured and recorded values are pre-processed wherein an initial filtering and refining of data takes place in step 105. The pre-processed data is sent to a database to perform data processing and analysis in step 106. The database can be comprised of hardware e.g., a USB, or be located in a cloud. The database preferably comprises pre-stored information that is used to provide a comparison between the measured data. This facilitates detecting any deterioration in the handrail.

The data is then processed and further filtered in step 107. Filtering involves removing outliers in order to take into account the behavior, normal or otherwise of the passenger moving system. This includes for example, removing any data which was recorded when for example:
 there was an increase in vibration within the passenger moving system;
 there was a significant increase in load due to a high number of passengers travelling on the passenger moving system.

In such exceptional situations, measured values will be abnormal and thus nota true reflection of the operation of the passenger moving system, in particular the handrail 14 under normal conditions. Once filtered, the data is analyzed in step 108.

Analysis can include for example:
 taking into account the resolution of the signal that generates points with minimum variation. This depends on the amount of data saved in the database. A reduction in resolution makes it easier to filter the results;
 selecting the maximum or minimum values for the data associated with a specific period of time. The nature of the selected values can vary between the maximum and minimum if desired;
 analyzing the selected values to detect the presence of a trend, e.g., whether there is a consistent decrease in the handrail speed;
 additionally, or alternatively to the preceding point, cross-checking an absolute value obtained with the pre-determined threshold value dF and/or with the data collected from another handrail, preferably the complementary handrail.

Once analysis is complete, the result obtained (step 109) provides a speed profile for the handrail 14. If the speed profile allows for the detection of a trend showing deterioration, a command signal initiating a maintenance operation is triggered and a predictive alert is generated in step 110 to inform the relevant party, e.g., the customer; a building services manager; a technician, that the handrail 14 of the handrail system 140 of the passenger moving system 10 needs to be inspected and where necessary, repaired, replaced or adjusted.

The command signal is triggered when:
 the trend shows a consistent increase or decrease in the handrail speed which is out of sync with the speed of the moving panels 13;
 a cross-checking of the absolute value with the threshold value shows a consistent increase or decrease in the handrail speed;
 the increase or decrease in the handrail speed has reached or exceeded the pre-determined threshold;
 an excessive trend or a value higher than the threshold is permanently detected;
 the variation between one particular value when compared with another particular value recorded in similar conditions but in a previous time interval has reached or exceeded the pre-determined threshold,
 any combination of the above.

It has thus been shown that the method according to the invention can be applied to any number of component parts of a passenger moving system, wherein said component part or parts is or are in communication with one or more sensor to detect a deterioration in the health of said component part.

REFERENCE SIGNS LIST

10 passenger moving system
11 sensor
12 sensor
n sensor
13 panel
140 handrail system
14 handrail
141 rolling element
142 sensor
15 handrail pulley/drive wheel
151 pulley jacket
16 pressure belt
17 compression spring
18 drive chain
19 drive shaft
20 length adjustment
d distance between sensor and pulley jacket
dF distance of fixed point
1 method
100 control unit
101 method step
102 method step
103 method step
104 method step
105 method step
106 method step
107 method step
108 method step
109 method step
110 method step

What is claimed is:
1. A control method for a control unit configured for predicting a deterioration in a component part of a passenger moving system having the control unit, the control method for the control unit comprising:

activating at least one sensor in communication with the component part;

performing data acquisition to acquire data from the at least one sensor; and processing the data;

repeating said processing step over a first specified time period;

triggering a command signal to initiate a maintenance operation and generating a predictive alert, both in response to the processed data reaching a predetermined threshold;

continuously checking measured values from the acquired data to identify any outlier data values that exceed the predetermined threshold, said checking step occurring simultaneously with said step of processing the data; and immediately filtering out the outlier data values so that they are not processed in, and do not influence, said processing step.

2. The control method of claim 1, wherein said step of performing data acquisition is continuously performed.

3. The control method of claim 1, wherein said step of performing data acquisition is repeated over a second specified time period.

4. The control method of claim 1, further comprising:
filtering the data; and
analyzing the data to determine the existence of any trend in the data.

5. The control method of claim 1, wherein the predetermined threshold is determined by:
selecting a specific measured value from the acquired data, and
selecting a defined percentage of the specific measured value, in order to form the pre-determined threshold.

6. The control method of claim 1, wherein the predetermined threshold is set according to a code of regulation for the passenger moving system.

7. The control method of claim 3, wherein the second specified time period is one of any number of months between 1 month and 50 months, or a pre-defined time interval over which data acquisition occurs.

8. The control method of claim 1, wherein the component part is a brake system.

9. The control method of claim 8, wherein said step of performing data acquisition is performed over a second specified time period, each time the passenger moving system is stopped.

10. The control method of claim 8, wherein the acquired data includes a calculated stopping distance.

11. The control method of claim 10, wherein said steps of triggering a command signal and generating a predictive alert occur in response to the calculated stopping distance reaching a predetermined stopping distance threshold.

12. The control method of claim 1, wherein the component part is a handrail system.

13. The control method of claim 12, wherein the handrails system includes a handrail, a pulley having a pulley jacket, and at least one rolling element.

14. The control method of claim 13, wherein said step of performing data acquisition comprises measuring a distance between the sensor and one or more of the pulley or the pulley jacket.

15. The control method of claim 13, wherein said step of performing data acquisition comprises measuring a speed at which the handrail is moving.

16. The control method of claim 13, wherein the processed data provides at least one of a speed profile of the handrail, or a health profile of the pulley and/or the pulley jacket, and wherein a trend is detectable therein.

17. The control method of claim 16, wherein said steps of triggering a command signal and generating a predictive alert occur upon a deterioration in at least one of the speed profile of the handrail, or the health profile of the pulley and/or the pulley jacket, and wherein the deterioration occurs upon the detected trend reaching or exceeding the predetermined threshold.

* * * * *